Patented Jan. 13, 1953

2,625,532

UNITED STATES PATENT OFFICE 2,625,532

ISOCYANATE MODIFIED POLYMERS

Nelson V. Seeger, Cuyahoga Falls, Ohio, assignor to Wingfoot Corporation, Akron, Ohio, a corporation of Delaware No Drawing. Application September 29, 1950,
Serial No. 187,696

18 Claims. (Cl. 260—45.4)

This invention relates to synthetic polymeric materials and to methods of preparing the same. More particularly it relates to modified polyesters which possess elastomeric, rubber-like qualities and to improved methods for their preparation. Still more particularly it relates to polyesters which have been modified by reaction with an organic diisocyanate and an additional bifunctional reactant to form an interpolymer.

The polyesters are formed, for example, by the condensation of a dibasic carboxylic acid with a glycol. The condensation reaction proceeds with the elimination of water to yield a linear polyester which is usually of a viscous, syrupy or wax-like consistency at room temperature.

As is determined by the materials and amounts thereof used in its formation, the linear polyester may contain terminal carboxyl or hydroxyl groups depending upon whether an acid or a glycol was the last compound to react in the formation of the linear molecule. The linear polyester is then lengthened further by reaction between these hydrogen-bearing terminal groups and a bifunctional material reactive therewith, such as a diisocyanate, with the formation of what may be referred to as a "chain-extended" polymer. The linkages formed by the reaction of the terminal groups of the polyester with a diisocyanate, for example, are a urethane linkage

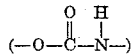

in the case of a terminal —OH group, and principally an amide linkage

in the case of a terminal —COOH group. Since each of these linkages contains available hydrogen for reaction with an additional bifunctional material such as a diisocyanate, it is possible to cross-link the chain-extended polymer at various points along its chain.

Depending upon many variables in their preparation, the modified polymers will vary considerably in their physical characteristics to include soft wax-like materials, elastomeric rubber-like materials, hard fiber-forming materials, tough leather-like materials and hard, infusible resinous materials. The present invention pertains to an improved modified interpolymer which has elastomeric, rubber-like properties.

The cross-linking or curing which occurs as the result of reaction between the —NCO groups of the diisocyanate and the available reactive hydrogen in the chain-extended polymer is accompanied by the generation of gas. This gas, which is believed to be $CO_2$, remains trapped in the mass with resulting blisters or bubbles in the cured product. To eliminate the trapped gas, it has been necessary to pre-cure the material, during which time most of the gas is generated, remove the material from the oven or press, remill the material to dissipate the trapped gas, and return the gas-free material to the press, or oven, for final cure. This procedure is both time-consuming and expensive because of the many handling operations required to produce a satisfactory cured product. It is therefore an object of this invention to reduce the time of cure required to produce a satisfactory product from modified polyesters. It is a further object to eliminate the blisters or gas bubbles in the cured product without the necessity of pre-cure and rehandling of the raw material. It is another object to reduce the number of handling operations in the fabrication of a satisfactory cured product. Still another object is to produce a new modified polyester which is fast curing at elevated temperatures but which does not harden or cure appreciably faster than the usual modified polyesters at normal room temperatures. Other objects will appear as the description proceeds.

The particular polyesters used in the practice of this invention are similar to those described in my co-pending application, Serial No. 170,055. As described therein, the unmodified polyester is prepared in its simplest form from two bifunctional ingredients, one being a dibasic carboxylic acid and the other being a glycol. In addition, a wide variety of complex polyesters may be formed by the reaction of a plurality of acids and glycols. In preparing the polyester it is possible to use ester mixtures such as a physical mixture of ethylene adipate and 1,2-propylene adipate as well as mixed esters such as that resulting from the reaction of a mixture of ethylene glycol and 1,2 propylene glycol with adipic acid. The reaction proceeds with the elimination of water to yield a long chain molecule containing a succession of ester groups and terminated by either hydroxyl or carboxyl radicals. The reaction may be represented by the following equation:

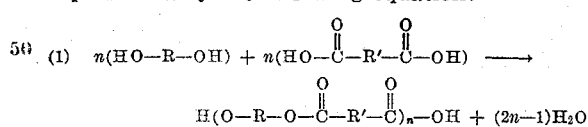

wherein R and R' denote divalent organic radicals such as hydrocarbon radicals, and $n$ is a positive whole number denoting the degree of polymerization of the polyester formed.

In the preparation of the polyester, it is possible to obtain products of varying molecular weight, depending in part upon the molecular weight of the reactants and in part upon the degree of polymerization of the reactants or the number of ester units in the polyester chain. While the average molecular weight of the polyester will, of course, vary depending upon the particular acids and glycols used, the average number of these ester groups present in the polyester chain must be held within certain limits in order to permit subsequent modification to yield a satisfactory rubber-like polymer. A convenient method of measuring the degree of polymerization of the polyester is to determine the average number of carboxyl and hydroxyl groups in a given amount of the linear extended polyester. The acid number (milligrams of KOH per gram of polyester using phenolphthalein as an indicator) is a measure of the number of terminal carboxyl groups in the polyester. The hydroxyl number, which is a measure of the number of terminal hydroxyl groups present, is determined by adding pyridine and acetic anhydride to the polyester and titrating the acetic acid formed with KOH as described in Ind. Eng. Chem. Anal. Ed. 16, 541–49 and in Ind. Eng. Chem. Anal. Ed. 17, 394 (1945). The hydroxyl number is defined as milligrams of KOH per gram of polyester. The sum of the acid number and the hydroxyl number, which will be referred to as the reactive number, is an indication of the average number of terminal groups present in the polyester product which in turn is an indication of the number of molecules in the mass and the degree of polymerization. A polyester containing long chain molecules will have a relatively low reactive number, while a polyester containing short chain molecules will possess a higher reactive number.

As described in my co-pending application, Serial No. 170,055, a rubber-like polymer is produced from a polyester having a reactive number from 40 to 107. In preferred practice, a polyester having a reactive number from 50 to 60 is employed. In addition, the acid number going to make up the reactive number is held to a maximum of 7. The acid number is conveniently controlled by providing an approximate 20 mol per cent excess of glycol in the preparation of the polyester.

In the chain extension of a polyester possessing an acid number and hydroxyl number within the critical range indicated, a controlled amount of a particular diisocyanate is added to the polyester as described in my co-pending application, Serial No. 170,055. When this diisocyanate-modified chain-extended polyester is subsequently cross-linked and cured by reaction with additional diisocyanate, the problem of gas formation or blisters arises. It has now been discovered that the addition of a small amount of another bifunctional additive, in addition to the diisocyanate added to chain-extend the unmodified polyester, will produce an uncured chain-extended modified polyester which will cross-link or cure, when reacted with additional diisocyanate, in a shorter time and with the elimination of blisters in the cured product.

The bifunctional additives which have been found to produce this unexpected result may be represented by the general formula X—R''—X' in which R'' represents a divalent organic radical such as an aliphatic, or aromatic, divalent radical, X represents either a —NH$_2$ or a —COOH group and X' is a functional group containing at least one active, available hydrogen such as a primary amino, secondary amino, carboxyl, or hydroxyl group. Compounds falling within this definition would include diamines, dibasic carboxylic acids, amino acids, hydroxy acids, amino alcohols, and certain ureas, guanidines, and thioureas which contain —NH$_2$ groups. According to the practice of this invention, the bifunctional additive described must be used in an amount such that the sum of —NH$_2$ equivalents and —COOH equivalents present in the bifunctional additive shall be from 0.06 to 0.48 equivalents per mol of polyester. Smaller amounts result in a finished product whose cure rate and blister forming have not been materially reduced. Greater amounts produce an uncured modified product which does not possess the required binaging or processing properties as described in my co-pending application referred to above.

Using the polyester formed as represented by Equation 1 above, the reactions between the polyester, the diisocyanate and the bifunctional additive may typically be represented by the following equations:

(2) HO—polyester—COOH + H$_2$N—R''—NH$_2$ + OCN—R'''—NCO ⟶

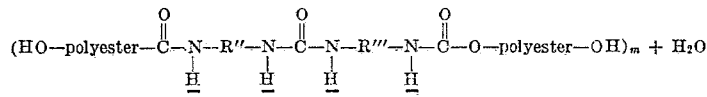

(3) HO—polyester—COOH + H$_2$N—R''—OH + OCN—R'''—NCO ⟶

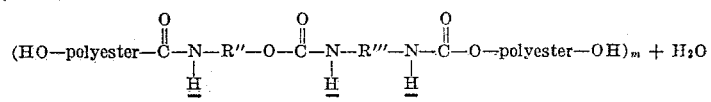

(4) HO—polyester—COOH + H$_2$N—R''—COOH + OCN—R'''—NCO ⟶

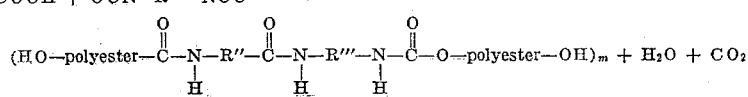

in which R'' and R''' represent divalent organic radicals such as aliphatic or aromatic radicals and $m$ represents a positive whole number denoting the number of segments in the modified chain-extended interpolymer.

The underlined hydrogens represent those available for reaction with the —NCO groups in the polyisocyanates used to cross-link or cure the chain-extended polyester. The products resulting from the reactions represented by the above equations may be referred to as (2) polyesteramide - urea - urethanes, (3) polyester - amide-urethane-urethanes, and (4) polyester-amide-amide-urethanes. Other configurations are also possible if dibasic carboxylic acids or hydroxy acids are used as the additional bifunctional reactant. In each case an interpolymer is formed possessing controlled amounts of urea, amide, or urethane linkages located at the end of and outside of the polyester segments in the chain-extended polyester. The arrangement of the amide, urea, and urethane linkages along the chain can be either random or ordered depending upon the manner in which the bifunctional additive is reacted with the polyester-diisocyanate mixture. If all of the additive and diisocyanate are added together to the polyester, a random interpolymer results. If the additive is reacted with the polyester-diisocyanate mixture in increments, an ordered interpolymer results. In either case a product is formed which will cure faster than the polyester modified by diisocyanate only and which will not require additional handling to remove trapped gas.

The particular diisocyanates with which this invention is concerned are 4,4'-diphenyl diisocyanate, 4,4'-diphenylene methane diisocyanate, dianisidine diisocyanate, 4,4'-tolidine diisocyanate, 1,5-naphthalene diisocyanate, 4,4'-diphenyl ether diisocyanate, and p-phenylene diisocyanate. It has been pointed out in my co-pending application referred to above that the critical range of diisocyanates which must be used to modify the polyester in order to produce a satisfactory rubber-like polymer is from 0.70 to 0.99 mols of diisocyanate per mol of polyester. An additional amount of diisocyanate is required here to satisfy the active hydrogens present in the bifunctional additive. Therefore, the total amount of diisocyanate required to chain-extend the polyester in order to produce a processible, storable, fast-curing interpolymer which does not produce blisters in the cured product will be equal to the sum of from 0.70 to 0.99 mols per mol of polyester and a molar amount equivalent to the mols of bifunctional additive used.

Of the particular diisocyanates shown, the preferred ones are 4,4'-diphenyl diisocyanate, 1,5-naphthalene diisocyanate, and diphenylene methane diisocyanate, the use of any of which produces an interpolymer which, when cured, possesses outstanding physical properties. It is possible to employ a mixture of diisocyanates in the preparation of the chain-extended polyester so long as the total amount of the diisocyanate used falls within the range indicated. While certain diisocyanates will not produce the desired results if used in an amount covered by the critical range specified, it is to be understood that those listed are not necessarily the only diisocyanates which are operative for the purposes of this invention, but rather represent those which have actually been tested and found to produce the desired results when employed in an amount covered by the critical range indicated.

After the interpolymer has been formed, it is prepared for curing by adding more diisocyanate or other conventional curing materials, such as alkyl ethers of hexamethylol melamine, with a 2,4-dihalo naphthol as accelerator. Polyisocyanates, such as 4,4',4''-triisocyanto triphenyl methane, 1,3,5-triisocyanto benzene, and 2,4,6-triisocyanto toluene, may also be used to effect a cure. Any organic diisocyanate, polyisocyanate, or mixtures of diisocyanates, polyisocyanates, or both, may be added in this step. It may be the same or a different diisocyanate than that used in the formation of the chain-extended polyester, or it may be a diisocyanate other than those listed above. The amount of polyisocyanate added to effect a cure must be controlled so as to provide a total number of —NCO equivalents present in the cured material, including that added in the formation of the chain-extended polyester, equal to the sum of from 2.80 to 3.20 equivalents of —NCO per mol of polyester and twice the molar amount of bifunctional additive used in the preparation of the interpolymer. Smaller amounts of polyisocyanate added to cure the interpolymer will result in an uncured product. The use of greater amounts is a waste of material with no improved properties in the cured product, and in some cases produces a cured material having properties more resinous than rubber-like. If a triisocyanate or tetraisocyanate is used to effect a cure, not as much material, on a mol basis, need be used since the curing or cross-linking of the linear molecules depends upon the number of —NCO groups present in the curing agent. For example, if 0.50 mols of a diisocyanate gives a satisfactory cure of the interpolymer, the use of approximately 0.25 mols of a tetraisocyanate will result in a similar state of cure.

The actual curing of the interpolymer is accomplished by methods familiar to those skilled in the art. The time and temperature required to effect the best cure for any particular material will, of course, vary as in the case with the curing of conventional natural rubber compounds. The cure for best results should be accomplished by the use of dry heat since exposure of the interpolymer to hot water or steam results in a partial degradation of the cured material.

A variety of acids and glycols may be used in the preparation of the polyester. Any dibasic carboxylic acid containing at least 3 carbon atoms, and preferably those whose carboxyl groups are attached to terminal carbons, may be used including succinic, glutaric, adipic, pimelic, suberic, azelaic, sebacic, malonic, brassylic, citric, tartaric, maleic, malic, fumaric, dilinoleic, thiobutyric, diphenic, isophthalic, terephthalic, hexahydroterephthalic, p-phenylene diacetic, dihydromuconic, and B-methyladipic acids. For best results the unsaturated acids should be used, in mixture with a saturated acid, in an amount not to exceed 5 mol per cent. The presence of a small amount of unsaturation in the polyester is often desirable if cheaper curing or cross-linking agents, such as for example, sulfur, benzoyl peroxide or tertiary butyl hydroperoxide, are to be used. Higher degrees of unsaturation in the polyester result in cured products which do not have the outstanding physical properties possessed by the products produced from polyesters containing no unsaturation or a relatively small amount of unsaturation.

Any glycol may be used in the formation of the polyester including ethylene, propylene 1,2, propylene 1,3, diethylene, triethylene, butylene, pentamethylene, hexamethylene, decamethylene, dodecamethylene, and N,N-diethanolaniline, glycerine mono ethers, and thiodiglycol.

Specific examples of the bifunctional additives which may be used in the practice of this invention are:

(1) The diamines which contain at least one primary amino group including, as representative examples, ethylene, propylene 1,2, tetramethylene 1,4, hexamethylene 1,6, decamethylene 1,10, isopropyl amino propylamine, 3,3'-diamino dipropyl ether, benzidine, diamino-diphenyl methane, p-phenylene, m-phenylene, and 2,4 tolylene diamine.

(2) The primary amino alcohols including, as representative examples, ethanolamine, 3 aminopropanol, 4 amino-butanol, 6 amino-hexanol, and 10 amino-decanol.

(3) The dibasic carboxylic acids including, as representative examples, those listed under the materials available for the preparation of the polyester.

(4) The ureas, guanidines, and thioureas containing an —NH2 group including, as representative examples, urea, thiourea, phenyl urea, phenyl guanidine, phenyl thiourea, methyl urea, and methyl thiourea.

(5) The amino carboxylic acids including, as representative examples, glycine, amino proprionic, aminocaproic, aminononanoic, and aminoundecanoic acids.

(6) The hydroxy carboxylic acids including, as representative examples, glycollic, hydroxycaproic, and hydroxydecanoic acids.

Any mixture of these bifunctional additives may be used so long as the total number of —COOH and —NH2 equivalents is held within the critical range indicated.

Listed below are the reactants which are used to form particular polyesters which, when modified by diisocyanate and one or more bifunctional additives and subsequently mixed with a suitable curing or cross-linking agent, will produce a material which is fast to cure at elevated temperatures, slow to cure at room temperature, and free of blisters.

1. Ethylene glycol plus adipic acid.
2. Propylene glycol 1,2 plus adipic acid.
3. Ethylene glycol (80 mol per cent), propylene glycol 1,2 (20 mol per cent) plus adipic acid.
4. Ethylene glycol (80 mol per cent), propylene glycol 1,2 (20 mol per cent) plus azelaic acid.
5. Ethylene glycol (80 mol per cent), propylene glycol 1,2 (20 mol per cent) plus sebacic acid.
6. Ethylene glycol (80 mol per cent), propylene glycol 1,2 (20 mol per cent) plus dilinoleic acid (20 mol per cent), adipic acid (80 mol per cent).
7. Ethylene glycol (80 mol percent), glycerine monoethyl ether (20 mol per cent), plus adipic acid.
8. Ethylene glycol (80 mol per cent), butylene glycol 1,4 (20 mol per cent), plus adipic acid.
9. Ethylene glycol (80 mol per cent), propylene glycol 1,3 (20 mol per cent) plus adipic acid.
10. Ethylene glycol (80 mol per cent), pentane diol 1,5 (20 mol per cent) plus adipic acid.
11. Ethylene glycol (80 mol per cent), glycerine monoisopropyl ether (20 mol per cent) plus adipic acid.
12. Ethylene glycol (80 mol per cent), propylene glycol 1,2 (20 mol per cent) plus maleic acid (from 3 to 6 mol per cent), adipic acid (from 97 to 94 mol per cent).
13. Ethylene glycol (80 mol per cent), propylene glycol 1,2 (from 18 to 5 mol per cent), dihydroxyethyl aniline (from 2 to 15 mol per cent) plus adipic acid.
14. Ethylene glycol (80 mol per cent), diethylene glycol (20 mol per cent) plus adipic acid.
15. Ethylene glycol (from 90 to 10 mol per cent), propylene glycol 1,2 (from 10 to 90 mol per cent) plus adipic acid.
16. Ethylene glycol (from 90 to 10 mol per cent), propylene glycol 1,2 (from 10 to 90 mol per cent) plus azelaic acid.

Of particular interest are the interpolymers resulting from—

(1) Polyethylene adipate modified by 4,4'-diphenyl diisocyanate, 1,5-naphthalene diisocyanate, 4,4'-diphenylene methane diisocyanate, or mixtures thereof, and by ethylene diamine, tetramethylene diamine, hexamethylene diamine, ethanol amine, benzidine, 4,4'-diamino diphenyl methane or mixtures thereof.

(2) Polypropylene 1,2 adipate modified by 4,4'-diphenyl diisocyanate, 1,5-naphthalene diisocyanate, 4,4'-diphenylene methane diisocyanate, or mixtures thereof, and by ethylene diamine, tetramethylene diamine, hexamethylene diamine, ethanol amine, benzidine, 4,4'-diamino diphenyl methane or mixtures thereof.

(3) Polyethylene (80 mol per cent) propylene 1,2 (20 mol per cent) adipate modified by 4,4'-diphenyl diisocyanate, 1,5-naphthalene diisocyanate, 4,4'-diphenylene methane diisocyanate, or mixtures thereof, and by ethylene diamine, tetramethylene diamine, hexamethylene diamine, ethanol amine, bendizine, 4,4'-diamino diphenyl methane or mixtures thereof.

(4) Polyethylene (80 mol per cent) propylene 1,2 (20 mol per cent) azelate modified by 4,4'-diphenyl diisocyanate, 1,5-naphthalene diisocyanate, 4,4'-diphenylene methane diisocyanate, or mixtures thereof, and by ethylene diamine, tetramethylene diamine, hexamethylene diamine, ethanol amine, bendizine, 4,4'-diamino diphenyl methane or mixtures thereof.

These interpolymers, when cured, have been found to possess outstanding physical properties.

The elastomeric reaction products prepared according to the practices of this invention are, in general, useful in those applications where natural rubber or rubber-like materials are used. In particular they may be used in tires, belts, hose, sheet packing, gaskets, molded goods, floor mats, dipped goods, sheeting, tank lining, soles, heels, covered rolls, and other mechanical and industrial goods.

The following examples in which parts are by weight are illustrative of the preparation of the modified polyesters according to the teachings of this invention.

EXAMPLE 1

*Preparation of typical polyester*

Adipic acid (3515 parts) was placed in a 5 liter, 3-necked flask fitted with a stirrer, thermo-couple well, gas inlet tube, distilling head, and condenser. To the acid were added 1064 parts of ethylene glycol and 869 parts of propylene 1,2 glycol. The molar ratio of dibasic acid to glycol is 1:1.19. The mixture was heated to 130–160° C. until most of the water had distilled off. The temperature was then gradually raised to 200° C., the pressure being gradually reduced to 20 mm., and nitrogen being bubbled through the melt. After 23½ hours a soft white waxy solid was obtained. Determinations showed the acid number to be 3.5 and the hydroxy number to be 58.6.

EXAMPLE 2

*Preparation of modified interpolymer*

The polyester (2270 parts) prepared according to Example 1 was placed in a steam-heated Baker-Perkins mixer, melted, and heated to 120° C. To this was added 0.12 mol of hexamethylene diamine per mol of polyester and 1.07 mols of 4,4'-diphenyl diisocyanate per mol of polyester. After ten minutes of mixing, the hot melt was poured into a carnauba wax coated tray and baked for 8 hours at 130° C. The resulting interpolymer had excellent processing characteristics on a rubber mill.

EXAMPLE 3

This interpolymer was prepared in the same manner as Example 2 except adipic acid was used as a molar replacement for the hexamethylene diamine. This product too had good processing characteristics on a rubber mill.

EXAMPLE 4

This interpolymer was prepared in the same manner as Example 2 except ethanolamine was used as a molar replacement for hexamethylene diamine. The processing characteristics of the material were good.

EXAMPLE 5

This interpolymer was prepared in the same manner as Example 2 except 0.24 mol of ethanolamine per mol of polyester and 1.19 mols of 4,4-diphenyl diisocyanate per mol of polyester were used. The reacted material possessed excellent processing characteristics on a rubber mill.

The uncured interpolymers prepared according to Examples 2, 3, 4, and 5 were mixed with 0.55 mol of additional 4,4-diphenyl diisocyanate and cured for 30 minutes and 300° F. with no precure. The cured material contained no blisters. The results obtained from tests showed the cured material to have excellent physical properties. Similar polymers prepared without the bifunctional additive resulted in cured material which was badly blistered unless the polymer was precured for 30 minutes at 300° F., removed from the press, remilled to remove the blisters formed, and returned to the press for final cure.

While certain representative embodiments and details have been shown for the purpose of illustrating the invention, it will be apparent to those skilled in this art that various changes and modifications may be made therein without departing from the spirit or scope of the invention.

I claim:

1. The elastomeric reaction product resulting from the reaction of a mixture comprising: A, a polyester prepared from bifunctional ingredients including at least one dibasic carboxylic acid containing at least 3 carbons and at least one glycol, said polyester having a hydroxyl number from 40 to 100 and an acid number from 0 to 7, and B, at least one bifunctional additive selected from the group consisting of diamines, amino alcohols, dibasic carboxylic acids, amino carboxylic acids, hydroxy carboxylic acids, and the ureas, guanidines, and thioureas containing a primary amino group, said bifunctional additive containing at least one reactive group selected from the group consisting of primary amino and carboxyl, said bifunctional additive being used in an amount such that the total number of —NH$_2$ and —COOH equivalents present in said bifunctional reactant shall be from 0.06 to 0.48 equivalent per mol of polyester, and C, at least one diisocyanate selected from the group consisting of 4,4' - diphenyl diisocyanate, 4,4' - diphenylene methane diisocyanate, dianisidine diisocyanate, 4,4'-tolidine diisocyanate, 1,5-naphthalene diisocyanate, 4,4'-diphenyl ether diisocyanate, and p-phenylene diisocyanate, the diisocyanate being used in an amount equal to the sum of from 0.70 mol to 0.99 mol of diisocyanate per mol of polyester and the molar amount of diisocyanate equivalent to the mols of said bifunctional additive used.

2. The elastomeric reaction product resulting from the reaction of a mixture comprising: A, a polyester prepared from bifunctional ingredients including adipic acid, ethylene glycol and propylene glycol, said polyester having a hydroxyl number from 40 to 100 and an acid number from 0 to 7, and B, at least one diamine containing at least one primary amino group, said diamine being used in an amount such that the total number of primary amino equivalents present in said diamine shall be from 0.06 to 0.48 equivalent per mol of polyester, and C, at least one diisocyanate selected from the group consisting of 4,4'-diphenyl diisocyanate, 4,4'-diphenylene methane diisocyanate, dianisidine diisocyanate, 4,4'-tolidine diisocyanate, 1,5-naphthalene diisocyanate, 4,4'-diphenyl ether diisocyanate, and p-phenylene diisocyanate, the diisocyanate being used in an amount equal to the sum of from 0.70 mol to 0.99 mol of diisocyanate per mol of polyester and a molar amount of diisocyanate equivalent to the mols of said diamine used.

3. The elastomeric reaction product resulting from the reaction product of a mixture comprising: A, a polyester prepared from approximately 80 mol percent of ethylene glycol, approximately 20 mol percent of propylene glycol 1,2, and adipic acid, said polyester having a hydroxyl number from 50 to 60 and an acid number from 0 to 7, and B, benzidine, said benzidine being used in an amount ranging from 0.03 to 0.24 mol per mol of polyester and C, 4,4'-diphenyl diisocyanate, said diisocyanate being used in an amount equal to the sum of from 0.90 to 0.99 mol per mol of polyester and a molar amount equivalent to the mols of benzidine used.

4. The process for making an elastomeric reaction product which comprises reacting together a mixture of: A, a polyester prepared from bifunctional ingredients including at least one dibasic carboxylic acid containing at least 3 carbons and at least one glycol, said polyester having a hydroxyl number from 40 to 100 and an acid number from 0 to 7, and B, at least one bifunctional additive selected from the group consisting of diamines, amino alcohols, dibasic carboxylic acids, amino carboxylic acids, hydroxy carboxylic acids, and the ureas, guanidines, and thioureas containing a primary amino group, said bifunctional additive containing at least one reactive group selected from the group consisting of primary amino and carboxyl, said bifunctional additive being used in an amount such that the total number of —NH$_2$ and —COOH equivalents present in said bifunctional reactant shall be from 0.06 to 0.48 equivalent per mol of polyester, and C, at least one diisocyanate selected from the group consisting of 4,4'-diphenyl diisocyanate, 4,4'-diphenylene methane diisocyanate, dianisidine diisocyanate, 4,4'-tolidine diisocyanate, 1,5-naphthalene diisocyanate, 4,4'-diphenyl ether diisocyanate, and p-phenylene diisocyanate, the diisocyanate being used in an amount equal to the sum of from 0.70 mol to 0.99 mol of diisocyanate per mol of polyester and the molar amount of diisocyanate equivalent to the mols of said bifunctional additive used.

5. The process for making an elastomeric reaction product which comprises reacting together a mixture of: A, a polyester prepared from bifunctional ingredients including adipic acid, ethylene glycol and propylene glycol, said polyester having a hydroxyl number from 40 to 100 and an acid number from 0 to 7, and B, at least one diamine containing at least one primary amino group, said diamine being used in an amount such that the total number of primary amino equivalents present in said diamaine shall be from 0.06 to 0.48 equivalent per mol of polyester, and C, at least one diisocyanate selected from the group consisting of 4,4'-diphenyl diisocyanate, 4,4'-diphenylene methane diisocyanate, dianisidine diisocyanate, 4,4'-tolidine diisocyanate, 1,5-naphthalene diisocyanate, 4,4'-diphenyl ether diisocyanate, and p-phenylene diisocyanate, the diisocyanate being used in an amount equal to the sum of from 0.70 mol to 0.99 mol of diisocyanate per mol of polyester and a molar amount of diisocyanate equivalent to the mols of said diamine used.

6. The process for making an elastomeric reaction product which comprises reacting together a mixture of: A, a polyester prepared from approximately 80 mol percent of ethylene glycol, approximately 20 mol percent of propylene glycol 1,2, and adipic acid, said polyester having a hydroxyl number from 50 to 60 and an acid number from 0 to 7, and B, bendizine, said benzidine being used in an amount ranging from 0.03 to 0.24 mol per mol of polyester and C, 4,4'-diphenyl diisocyanate, said diisocyanate being used in an amount equal to the sum of from 0.90 to 0.99 mol per mol of polyester and a molar amount equivalent to the mols of benzidine used.

7. The process for making a cured elastomeric composition which comprises reacting the product prepared according to claim 5 with a sufficient amount of at least one polyisocyanate to bring the total number of —NCO equivalents present in said cured mixture to the sum of from 2.80 to 3.20 equivalents of —NCO per mol of said polyester and twice the molar amount of bifunctional additive used in the preparation of said elastomeric reaction product.

8. The cured elastomeric composition prepared according to the process defined by claim 7.

9. An article comprising the cured elastomeric composition defined by claim 8.

10. The cured elastomeric composition defined by claim 8 in which the polyester is prepared from adipic acid.

11. The cured elastomeric composition defined by claim 8 in which the polyester is prepared from azelaic acid.

12. The elastomeric reaction product defined by claim 1 in which the bifunctional additive used is diamino diphenyl methane.

13. The elastomeric reaction product defined by claim 12 in which the polyester is prepared from adipic acid.

14. The elastomeric reaction product defined by claim 1 in which the bifunctional additive used is tolylene diamine.

15. The elastomeric reaction product defined by claim 14 in which the polyester is prepared from adipic acid.

16. The elastomeric reaction product defined by claim 1 in which the diisocyanate used is 1,5-naphthalene diisocyanate.

17. The elastomeric reaction product defined by claim 16 in which the polyester is prepared from adipic acid.

18. The elastomeric reaction product defined by claim 1 in which the polyester is prepared from azelaic acid.

NELSON V. SEEGER.

REFERENCES CITED

The following references are of record in the file of this patent:

UNITED STATES PATENTS

| Number | Name | Date |
|---|---|---|
| 2,333,639 | Christ et al. | Nov. 9, 1943 |
| 2,437,046 | Rothrock et al. | Mar. 2, 1948 |

OTHER REFERENCES

Ser. No. 397,741, Schlack (A. P. C.), published Apr. 20, 1943.

Bayer et al., Rubber Chem. and Techn. Oct.-Dec. 1950, pp. 812–835 (translated from Angewandte Chemie, vol. 62 No. 3, pp. 57–66, Feb. 7, 1950).